April 10, 1928. 1,665,845
D. C. COX
ANTISLUDGING MEANS FOR OIL
Filed Sept. 28 1926
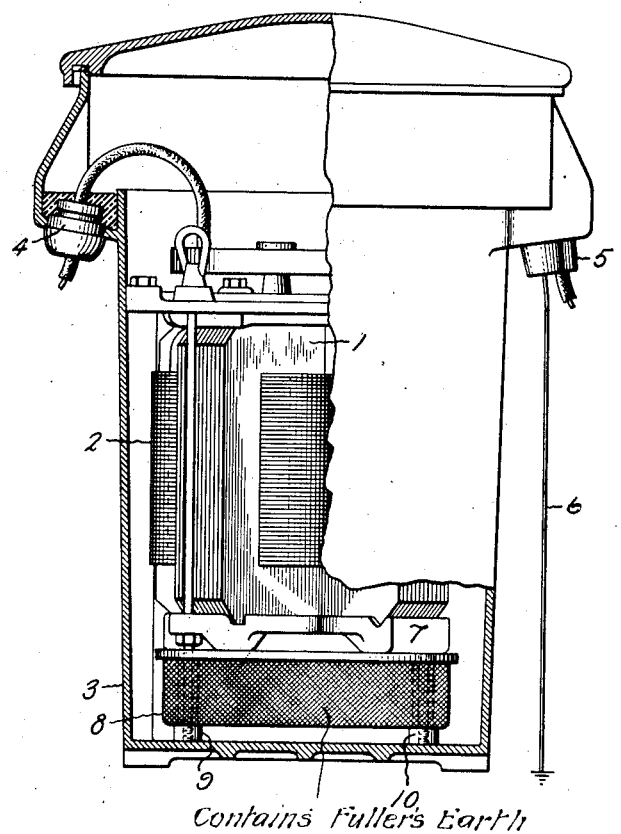
Contains Fuller's Earth
Inventor:
David C. Cox,
by [signature]
His Attorney.

Patented Apr. 10, 1928.

1,665,845

UNITED STATES PATENT OFFICE.

DAVID C. COX, OF SOLDIER SUMMIT, UTAH, ASSIGNOR TO GENERAL ELECTRIC COMPANY, A CORPORATION OF NEW YORK.

ANTISLUDGING MEANS FOR OIL.

Application filed September 28, 1926. Serial No. 138,303.

The present invention relates to devices, such as transformers or capacitors, having a bath of mineral oil which is heated for long periods of time to an elevated temperature. It is the object of my invention to increase the length of time that such a device may be operated with a given charge of oil.

When mineral oil is operated at a high temperature for a protracted length of time, a semi-solid precipitate or sludge forms in the oil. This sludge appears to be an oxidation product and includes complex acids and other deleterious substances.

In accordance with my invention, the useful life of insulating oil is greatly extended by providing a charge of fuller's earth in contact with the oil in an oil-containing apparatus.

One embodiment of my invention is illustrated by the accompanying drawing showing in side elevation a transformer, provided with a charge of fuller's earth, the tank wall being in part broken away.

Referring to the drawing, the transformer comprises the usual standard parts, such as a core 1 and windings 2 contained within a tank 3 and provided with the usual terminals 4, 5 and ground connection 6. These and accessory members have been shown merely as being illustrative of a transformer. At the bottom of the tank 3 and below the yoke 7 of the core is a wire mesh basket 8, supported on suitably insulated standards 9, 10, and containing the charge of fuller's earth. The basket 8 may be lined with wire screen of sufficient fineness to hold the granules of earth. Although the amount of fuller's earth may be varied greatly, I have found that about six percent by volume of fuller's earth in the oil to be effective in increasing the useful life of the oil about two or three times. A larger percentage of fuller's earth in the oil is even more effective but, of course, a much larger bulk of fuller's earth becomes cumbersome.

It is not essential that the fuller's earth shall be located in a container or that it shall be located in any particular place in a transformer or similar device. The arrangement shown in the drawing is illustrative of one means for carrying out my invention.

The action of the fuller's earth in decreasing sludging is not understood. It acts as an absorber of potential sludge, namely, products of oxidation, which first appear as a discoloration in the oil. This coloring matter not only eventually would saturate the oil and then precipitate as a sludge, but it acts also as a catalyst for further oxidation.

What I claim as new and desire to secure by Letters Patent of the United States, is:

1. In combination with a charge of mineral oil which is subjected to an elevated temperature for a sufficient length of time to permit sludging to occur, a body of fuller's earth in contact with said oil, and sufficient in quantity to reduce sludging of the oil.

2. In an electrical device containing a charge of mineral oil, and operable at an elevated temperature, the provision of a quantity of fuller's earth in contact with said oil.

3. An electric transformer containing a quantity of insulating oil and a body of fuller's earth in contact with said oil.

4. An electric transformer comprising a tank, transformer elements therein, a quantity of mineral oil in said tank, a body of fuller's earth having a volume of about six percent of the volume of said oil, and means for supporting said body of earth in contact with said oil.

In witness whereof, I have hereunto set my hand this 20th day of Sept. 1926.

DAVID C. COX.